(12) United States Patent
van Iperen

(10) Patent No.: US 10,220,449 B2
(45) Date of Patent: Mar. 5, 2019

(54) DEBURRING TOOL AND METHOD FOR DEBURRING A HOLE

(71) Applicant: SECO TOOLS AB, Fagersta (SE)

(72) Inventor: Jan-Willem van Iperen, Lottum (NL)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 15/534,687

(22) PCT Filed: Nov. 6, 2015

(86) PCT No.: PCT/EP2015/075971
§ 371 (c)(1),
(2) Date: Jun. 9, 2017

(87) PCT Pub. No.: WO2016/091496
PCT Pub. Date: Jun. 16, 2016

(65) Prior Publication Data
US 2017/0334001 A1 Nov. 23, 2017

(30) Foreign Application Priority Data
Dec. 12, 2014 (EP) ..................................... 14197682

(51) Int. Cl.
*B23B 51/10* (2006.01)
*B23C 3/12* (2006.01)
*B23C 5/10* (2006.01)

(52) U.S. Cl.
CPC .......... *B23B 51/102* (2013.01); *B23B 51/101* (2013.01); *B23C 3/12* (2013.01);
(Continued)

(58) Field of Classification Search
CPC ................. Y10T 408/83; Y10T 408/85; Y10T 408/8583; Y10T 408/85837;
(Continued)

(56) References Cited

U.S. PATENT DOCUMENTS 477,225 A * 6/1892 Rauhe ..................... A61C 3/02
433/165
1,813,741 A * 7/1931 Harper ..................... A61C 3/02
433/165
(Continued)

FOREIGN PATENT DOCUMENTS

DE     3629562 C1 * 11/1987 ......... B23B 51/0018
DE   102009012670 A1   9/2010
(Continued)

OTHER PUBLICATIONS

JP 2010-247265 Machine Translation, pp. 7-16, May 22, 2018.*

*Primary Examiner* — Nicole N Ramos
(74) *Attorney, Agent, or Firm* — Corinne R. Gorski

(57) ABSTRACT

A deburring tool includes a shank attached at a first end to a chuck and a working portion at a second end of the shank. The working portion includes a first end portion closest to and joining the second end of the shank at a first end of the first end portion, a second end portion furthest from the shank, and an intermediate portion disposed between the first end portion and the second end portion, a first end of the intermediate portion joining a second end of the first end portion and a second end of the intermediate portion joining a first end of the second end portion. The intermediate portion tapers continuously from a largest diameter at the first end of the intermediate portion to a smallest diameter at the second end of the intermediate portion, and deburring cutter members provided on the second end portion adjacent the second end of the intermediate portion.

12 Claims, 3 Drawing Sheets

(52) U.S. Cl.
CPC ............ *B23C 5/10* (2013.01); *B23B 2220/08* (2013.01); *B23B 2251/242* (2013.01); *B23B 2251/247* (2013.01); *B23B 2265/08* (2013.01); *B23C 2220/20* (2013.01); *B23C 2265/08* (2013.01)

(58) Field of Classification Search
CPC ........... Y10T 408/85843; Y10T 408/89; Y10T 408/905; Y10T 408/906; B23B 51/00; B23B 51/10; B23B 51/101; B23B 2251/50; B23B 29/034
See application file for complete search history.

(56) References Cited

U.S. PATENT DOCUMENTS

| | | | | |
|---|---|---|---|---|
| 3,370,508 A * | 2/1968 | Iaia | ............ | B23C 3/28 144/86 |
| 3,534,476 A * | 10/1970 | Winters | ............ | A61C 3/02 433/165 |
| 4,684,346 A * | 8/1987 | Martin | ............ | A61C 3/02 433/102 |
| 4,971,486 A | 11/1990 | Rinklake et al. | | |
| 5,000,630 A * | 3/1991 | Riley | ............ | B23B 51/00 407/1 |
| 5,193,943 A | 3/1993 | Kim | | |
| 5,678,962 A * | 10/1997 | Hyatt | ............ | B23G 5/188 408/222 |
| 5,823,775 A * | 10/1998 | Aono | ............ | A61C 3/02 433/166 |
| 6,257,889 B1 * | 7/2001 | Boston | ............ | A61C 3/02 433/165 |
| 6,851,901 B2 * | 2/2005 | Havskog | ............ | B23D 77/006 407/54 |
| 7,278,806 B1 | 10/2007 | Clayton | | |
| 2001/0007628 A1 * | 7/2001 | Ninomiya | ............ | B23B 51/00 411/180 |
| 2003/0215295 A1 * | 11/2003 | Gaiser | ............ | B23B 51/105 408/59 |
| 2012/0056012 A1 | 3/2012 | Yang | | |

FOREIGN PATENT DOCUMENTS

| | | | |
|---|---|---|---|
| EP | 2174616 A1 | | 4/2010 |
| GB | 2399781 A | | 9/2004 |
| JP | H08290315 A | | 11/1996 |
| JP | H10225813 A | | 8/1998 |
| JP | 2005074523 A | | 3/2005 |
| JP | 2010247265 A | * | 11/2010 |

* cited by examiner

DEBURRING TOOL AND METHOD FOR DEBURRING A HOLE

RELATED APPLICATION DATA

This application is a § 371 National Stage Application of PCT International Application No. PCT/EP2015/075971 filed Nov. 6, 2015 claiming priority of EP Application No. 14197682.9, filed Dec. 12, 2014.

BACKGROUND AND SUMMARY

The present invention relates to a deburring tool and, more particularly, to a deburring tool and method for deburring a hole that extends entirely through a workpiece.

When deburring edges of a hole that extends through a workpiece where a distal edge of the hole is disposed on an opposite side of the workpiece from the deburring tool, or when attempting to simultaneously debur both distal and proximal edges of a hole that extends through a workpiece, it is common to use a deburring tool having one or two enlarged ends with deburring cutter members on at least a distal one of the enlarged ends, and an intermediate member having a smaller diameter than the enlarged end at the distal end of the deburring tool. The deburring tool is moved in a circular path around the hole with the intention that at least the deburring cutter members on the enlarged distal end of the deburring tool will debur the distal edge of the hole. The intention is that the longitudinal axis of the deburring tool will remain straight as the deburring operation occurs. U.S. Pat. No. 7,278,806 discloses a deburring tool of this type. The reality, however, is that the deburring tool will often bend as a result of the forces to the tool, and this may interfere with deburring the distal edge of the hole.

It is desirable to provide a deburring tool and method that can debur a distal hole edge and/or two hole edges while minimizing problems associated with bending of the deburring tool.

According to an aspect of the present invention, a deburring tool includes a shank attachable at a first end to a chuck and a working portion at a second end of the shank. The working portion includes a first end portion closest to and joining the second end of the shank at a first end of the first end portion, a second end portion furthest from the shank, and an intermediate portion between the first end portion and the second end portion, a first end of the intermediate portion joining a second end of the first end portion and a second end of the intermediate portion joining a first end of the second end portion. The intermediate portion tapers continuously from a largest diameter at the first end of the intermediate portion to a smallest diameter at the second end of the intermediate portion, at least part of the second end portion has a larger diameter than the second end of the intermediate portion, and deburring cutter members are provided on the second end portion adjacent the second end of the intermediate portion.

According to another aspect of the present invention, a method of deburring a hole extending from a first surface to a second surface of a workpiece using the deburring tool includes extending the working portion of the deburring tool through the hole so that the first end portion contacts the first surface of the workpiece, rotating the deburring tool about a longitudinal axis thereof and deburring the hole adjacent the second surface of the workpiece with the deburring cutters on the second end portion, and, while rotating the deburring tool about the longitudinal axis thereof, pivoting the deburring tool in a circular fashion so that the second end portion of the deburring tool moves in a circular path and the first end portion of the deburring tool and the first surface of the workpiece define a fulcrum.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
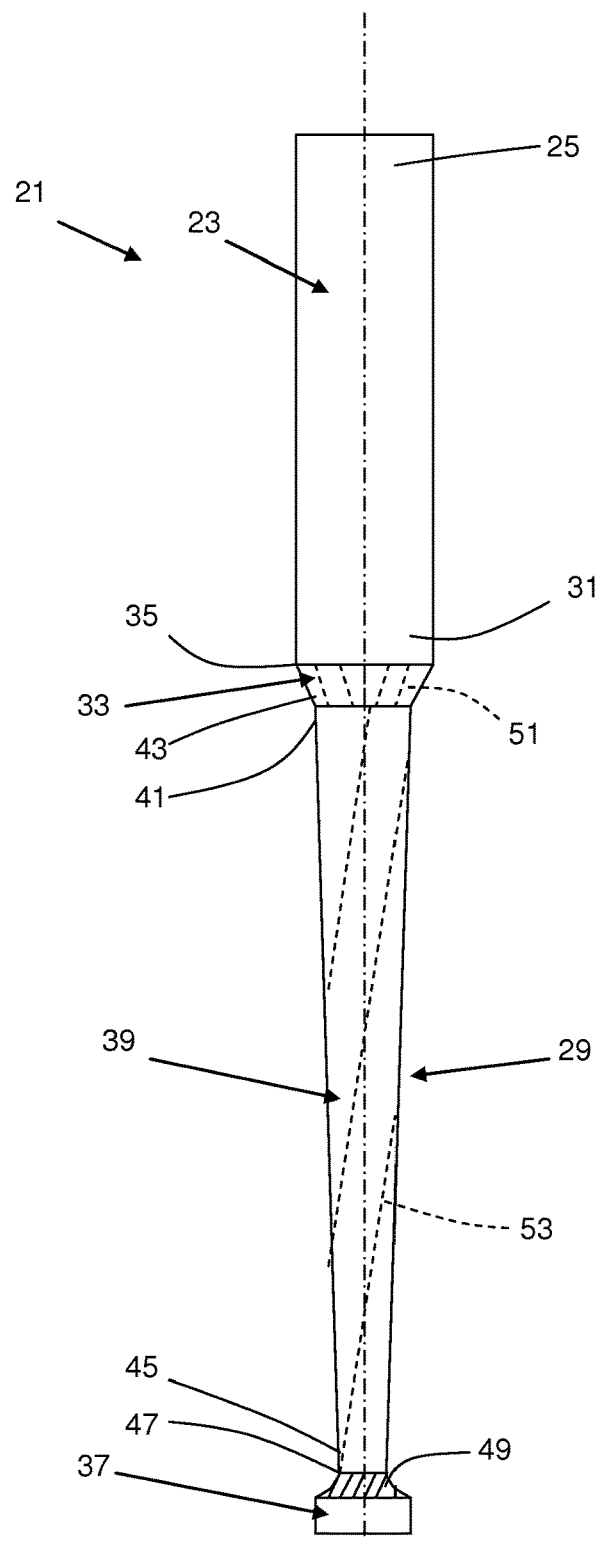
FIG. 1A is a side view of a deburring tool according to an aspect of the present invention.

A deburring tool 21 according to an aspect of the present invention is shown in FIG. 1A. The deburring tool 21 comprises a shank 23 attachable at a first end 25 to a chuck 27 (shown in phantom in FIG. 1B). The shank 23 will typically be cylindrical or substantially cylindrical, and may be circularly cylindrical or some non-circular shape, such as a hexagonal shape that is easily gripped by tools such as wrenches. The chuck 27 may be part of a stationary tool such as a CMC machine or part of a hand-held tool such as a hand drill.

Figure 1B:
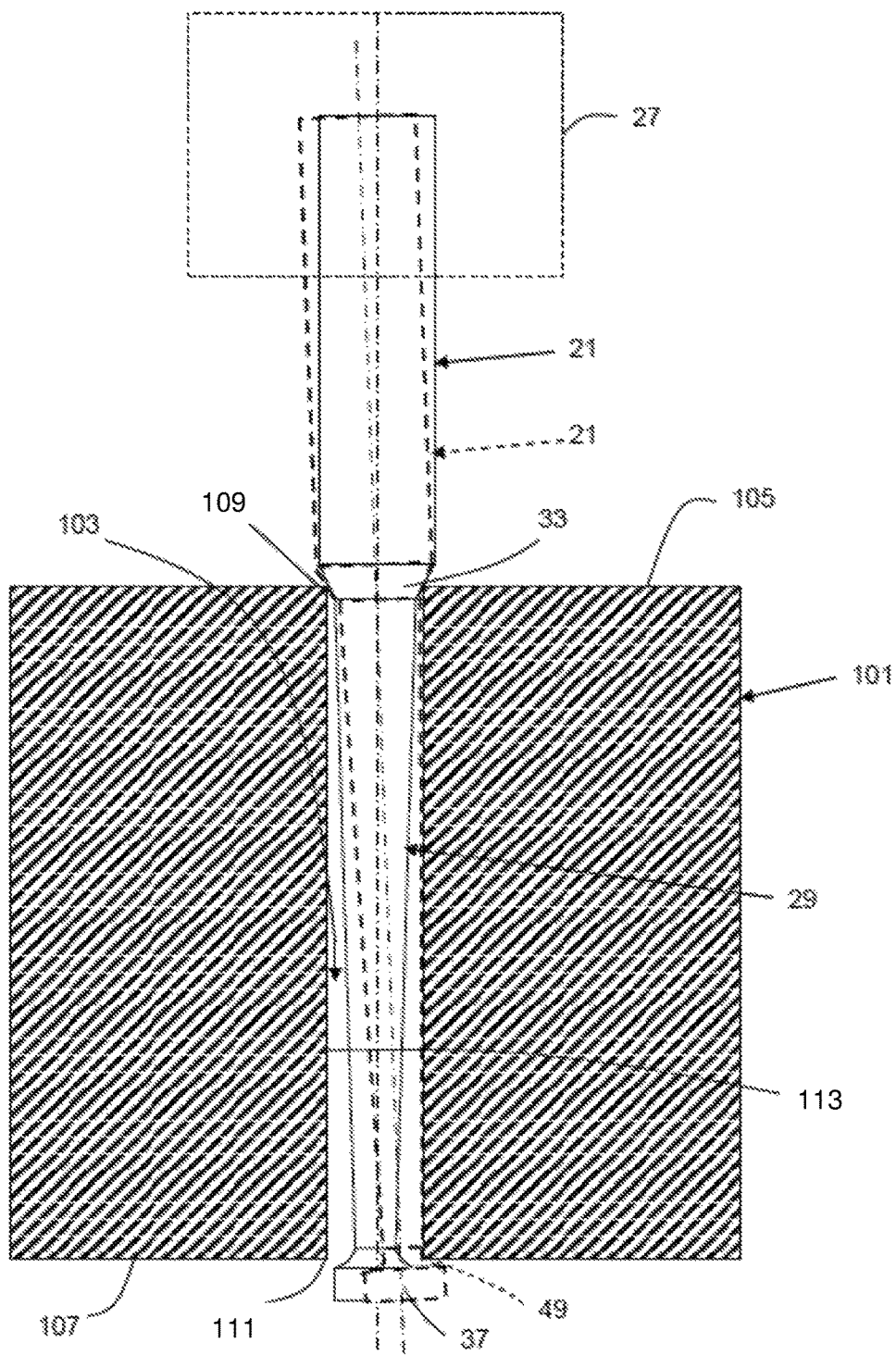
FIG. 1B is a side view of the deburring tool of FIG. 1A used in a deburring method according to an aspect of the present invention.

As seen in FIG. 1B, the deburring tool 21 is intended for use on a workpiece 101 having a hole 103 extending therethrough from a first surface 105 to a second surface 107 and is adapted to debur one or both of the first and second edges 109 and/or 111 of the hole at the first and second surfaces. The deburring tool 21 may also debur or otherwise work on a surface 113 of the hole between the first and second edges 109 and 111.

The deburring tool 21 comprises a working portion 29 at a second end 31 of the shank 23. The working portion 29 comprises a first end portion 33 closest to and joining the second end 31 of the shank 23 at a first end 35 of the first end portion. The working portion 29 further comprises a second end portion 37 furthest from the shank 23.

An intermediate portion 39 is disposed between the first end portion 33 and the second end portion 37. A first end 41 of the intermediate portion 39 joins a second end 43 of the first end portion 33 and a second end 45 of the intermediate portion joins a first end 47 of the second end portion 37.

The intermediate portion 39 tapers continuously from a largest diameter at the first end 41 of the intermediate portion to a smallest diameter at the second end 45 of the intermediate portion. At least part of the second end portion 37 has a larger diameter than the second end 45 of the intermediate portion, i.e., the second end portion increases in diameter from the point where it joins the second end of the intermediate portion.

Deburring cutter members 49 such as file teeth as disclosed, for example, in U.S. Patent App. Pub. US2012/0056012, which is incorporated by reference, or deburring cutters such as are disclosed, for example, in U.S. Pat. No.

7,278,806, which is incorporated by reference, are provided on the second end portion 37 adjacent the second end 45 of the intermediate portion 39. A length of the intermediate portion 39 will often but not necessarily be chosen so that the deburring tool 21 will be of particular use in a hole of a specific length so that the first end portion 33 of the working portion 29 abuts the first surface The first end portion 33 may also comprise deburring cutter members 51 (shown in phantom) adjacent the first end 41 of the intermediate portion 39, or the first end portion may be smooth, i.e., in the sense that no deburring cutter members are provided. It may be desirable to provide deburring cutter members 51 at the first end portion 33 when it is desired to simultaneously debur both edges 109 and 111 of the hole 103. The first end portion 33 typically increases in diameter from the second end 33 of the first end portion to the first end 35 of the first end portion. The first end portion 33 may, however, merely constitute a transition from the first end 41 of the intermediate portion 39 to the second end 31 of the shank 23.

Figure 2:
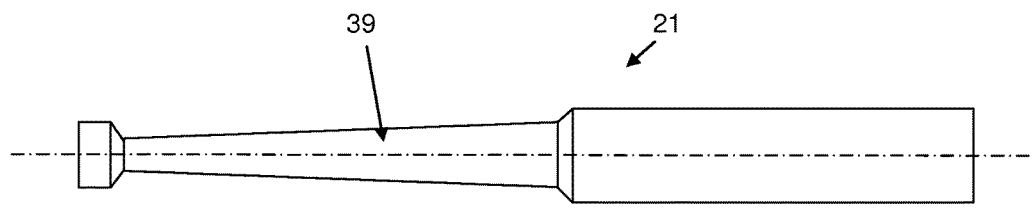
FIG. 2 is a side view of a deburring tool according to another aspect of the present invention.

As seen in FIG. 2, the intermediate portion 39 of the deburring tool 21 may comprise a truncated cone. Such a shape may be useful when it is desired to contact the surface 113 of the hole 103 in the workpiece 101.

Figure 3:
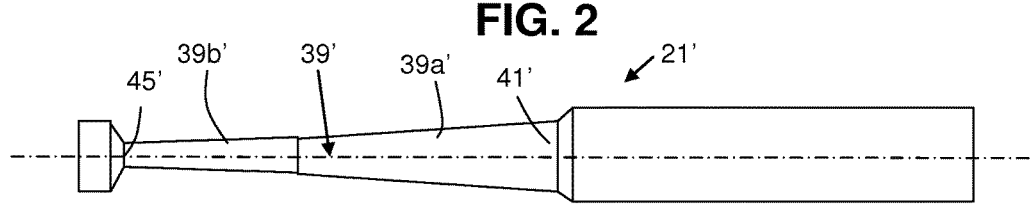
FIG. 3 is a side view of a deburring tool according to yet another aspect of the present invention.
Figure 4:
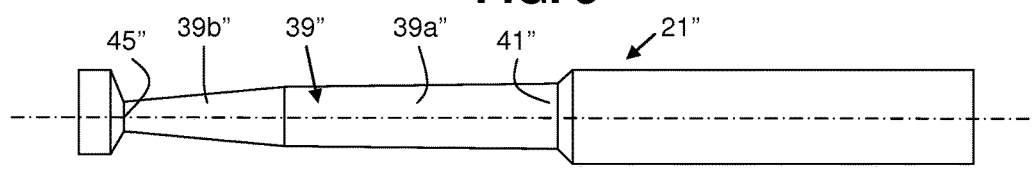
FIG. 4 is a side view of a deburring tool according to still another aspect of the present invention.

As seen in FIGS. 3 and 4, the intermediate portion 39' and 39" of deburring tools 21' and 21" may comprise a plurality of truncated cones. In the embodiment shown in FIG. 3, a first one 39a' of the plurality of truncated cones closest to the first end 41' of the intermediate portion 39' has a larger cone angle than a second one 39b' of the truncated cones closest to the second end 45 of the intermediate portion. In the embodiment shown in FIG. 4, a first one 39a" of the plurality of truncated cones closest to the first end 41" of the intermediate portion 39" has a smaller cone angle than a second one 39b" of the truncated cones closest to the second end 45" of the intermediate portion.

Figure 5:
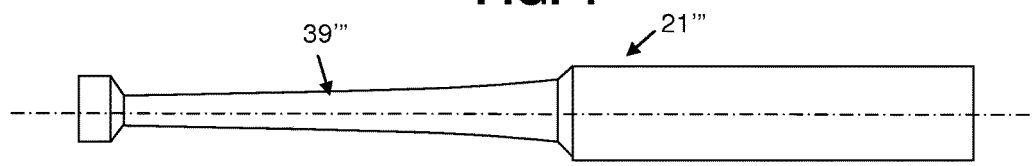
FIG. 5 is a side view of a deburring tool according to still yet another aspect of the present invention.

As seen in FIG. 5, the intermediate portion 39''' of the deburring tool 21''' can comprise a curved surface.

A common characteristic of each deburring tool 21, 21', 21", and 21' is that the intermediate portion 39, 39', 39", 39' tapers continuously from a largest diameter at the first end 41, 41', 41", 41' of the intermediate portion to a smallest diameter at the second end 45, 45', 45", 45' of the intermediate portion.

As seen in phantom in FIG. 1A, the intermediate portion 39 may include deburring cutter members 53 thereon. The deburring cutter members 53 may be in the form of flutes or flutes can be provided instead of or in addition to deburring cutter members. The intermediate portion 39 may, instead of having flutes or deburring cutter members, have a substantially smooth surface, which may be desirable if it is only intended to debur the edges 109 and/or 111 of the hole 103 in the workpiece 101.

A method of deburring the hole 103 extending from the first surface 105 to the second surface 107 of the workpiece 101 is shown in FIG. 1B using a deburring tool is described in connection with the deburring tool 21 shown in FIG. 1A. According to the method, the working portion 29 of the deburring tool 21 is extended through the hole 103 so that the first end portion 33 contacts the first surface 105 of the workpiece 101. The deburring tool 21 is rotated about a longitudinal axis thereof (e.g., by a CMC machine or handheld drill) so that the deburring cutter members 49 on the second end portion 37 of the working portion 29 debur the edge 111 of the hole 103 adjacent the second surface 107 of the workpiece 101.

While rotating the deburring tool 21 about the longitudinal axis thereof, the deburring tool is pivoted in a circular fashion (deburring tool 21 in a pivoted position shown in phantom) so that the second end portion 37 of the deburring tool moves in a circular path and the deburring cutter members 49 debur the edge 111 of the hole 103 around its entire periphery. While pivoting the deburring tool in the circular fashion, the first end portion 33 of the deburring tool and the first surface 105 of the workpiece 101 and, typically, the first edge 109 of the hole 103, define a fulcrum about which the deburring tool is pivoted. By this tool and method, problems due to, e.g., bending of the working portion can be reduced as deburring can be accomplished even if the deburring tool bends. Moreover, bending of the deburring tool may be reduced in some circumstances by selecting an appropriate profile for the intermediate portion of the deburring tool.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A deburring tool comprising:
    a shank attached at a first end to a chuck; and
    a working portion disposed at a second end of the shank, the working portion comprising a first end portion closest to and joining the second end of the shank at a first end of the first end portion, a second end portion located furthest from the shank, and an intermediate portion located between the first end portion and the second end portion, a first end of the intermediate portion joining a second end of the first end portion and a second end of the intermediate portion joining a first end of the second end portion,
    wherein the intermediate portion tapers continuously from a largest diameter at the first end of the intermediate portion to a smallest diameter at the second end of the intermediate portion, at least part of the second end portion having a larger diameter than the second end of the intermediate portion, the second end portion includes a proximal portion proximal to the second end of the intermediate portion and a distal portion distal to the second end of the intermediate portion, the first end portion increases in diameter from the second end of the first end portion to the first end of the first end portion, and deburring cutter members are provided on the proximal portion of the second end portion adjacent the second end of the intermediate portion.

2. The deburring tool as set forth in claim 1, wherein the first end portion also includes deburring cutter members adjacent the first end of the intermediate portion.

3. The deburring tool as set forth in claim 1, wherein the first end portion is smooth.

4. The deburring tool as set forth in claim 1, wherein the intermediate portion comprises a truncated cone.

5. The deburring tool as set forth in claim 1, wherein the intermediate portion comprises a plurality of truncated cones.

6. The deburring tool as set forth in claim 5, wherein a first one of the plurality of truncated cones that is closest to the first end of the intermediate portion has a larger cone angle than a second one of the truncated cones that is closest to the second end of the intermediate portion.

7. The deburring tool as set forth in claim 5, wherein a first one of the plurality of truncated cones that is closest to the first end of the intermediate portion has a smaller cone angle than a second one of the truncated cones that is closest to the second end of the intermediate portion.

8. The deburring tool as set forth in claim 1, wherein the intermediate portion has a curved surface.

9. The deburring tool as set forth in claim 1, wherein the intermediate portion includes deburring cutter members thereon.

10. The deburring tool as set forth in claim 1, wherein the intermediate portion includes a plurality of flutes thereon.

11. The deburring tool as set forth in claim 1, wherein the intermediate portion has a substantially smooth surface.

12. A method of deburring a hole extending from a first surface to a second surface of a workpiece using a deburring tool, comprising:
   providing the deburring tool, the deburring tool including a shank attached at a first end to a chuck, and a working portion disposed at a second end of the shank, the working portion comprising a first end portion closest to and joining the second end of the shank at a first end of the first end portion, a second end portion located furthest from the shank, and an intermediate portion located between the first end portion and the second end portion, a first end of the intermediate portion joining a second end of the first end portion and a second end of the intermediate portion joining a first end of the second end portion, wherein the intermediate portion tapers continuously from a largest diameter at the first end of the intermediate portion to a smallest diameter at the second end of the intermediate portion, at least part of the second end portion having a larger diameter than the second end of the intermediate portion, the second end portion includes a proximal portion proximal to the second end of the intermediate portion and a distal portion distal to the second end of the intermediate portion, the first end portion increases in diameter from the second end of the first end portion to the first end of the first end portion, and deburring cutter members are provided on the proximal portion of the second end portion adjacent the second end of the intermediate portion;
   extending the working portion of the deburring tool through the hole so that the first end portion contacts the first surface of the workpiece;
   rotating the deburring tool about a longitudinal axis thereof and deburring the hole adjacent the second surface of the workpiece with the deburring cutters on the proximal portion of the second end portion; and
   while rotating the deburring tool about the longitudinal axis thereof, pivoting the deburring tool in a circular fashion so that the proximal portion of the second end portion of the deburring tool moves in a circular path and the first end portion of the deburring tool and the first surface of the workpiece define a fulcrum.

* * * * *